Dec. 1, 1925.  
R. BURRELL  
SLED  
Filed Jan. 21, 1925  
1,563,832
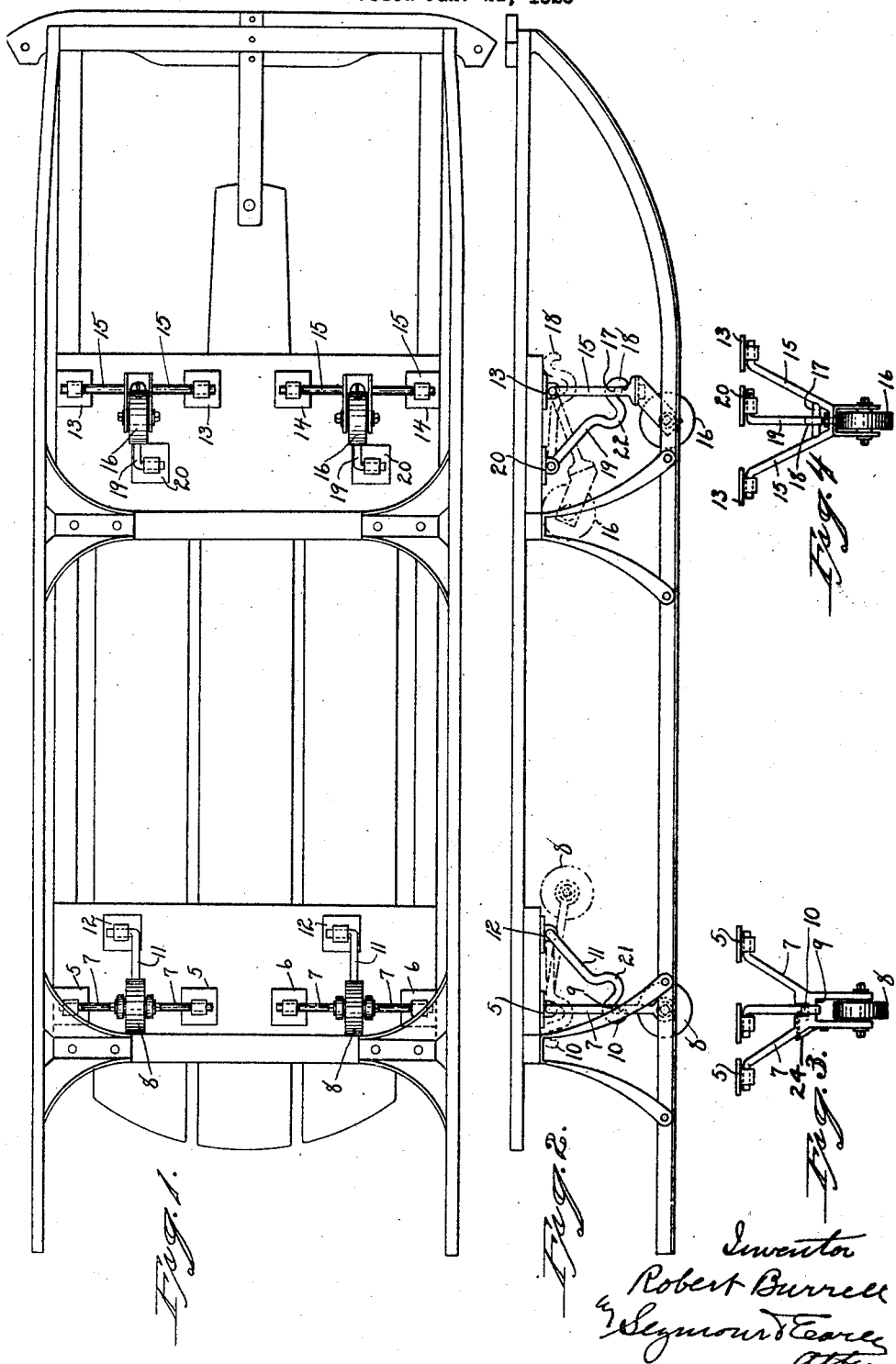

Patented Dec. 1, 1925.

1,563,832

UNITED STATES PATENT OFFICE.

ROBERT BURRELL, OF NEW HAVEN, CONNECTICUT.

SLED.

Application filed January 21, 1925. Serial No. 3,767.

*To all whom it may concern:*

Be it known that I, ROBERT BURRELL, a citizen of the United States, residing at New Haven, in the county of New Haven and State of Connecticut, have invented a new and useful Improvement in Sleds; and I do hereby declare the following, when taken in connection with the accompanying drawings and the characters of reference marked thereon, to be a full, clear, and exact description of the same, and which said drawings constitute part of this application, and represent, in—

Fig. 1 an underside view of a sled constructed in accordance with my invention.

Fig. 2 a side view of the same.

Fig. 3 a rear view of one of the rear rollers, detached.

Fig. 4 a front view of one of the front rollers, detached.

This invention relates to improvement in sleds, and particularly to sleds provided with wheels or rollers which can be turned down to a point below the runner and support the sled and allow it to be drawn over bare ground, the object of the invention being to provide rollers of simple and convenient construction, of sufficient strength, and readily turned down into operative position or retired, and the invention consists in the construction as hereinafter described and particularly recited in the claim.

Near the rear of the sled, I mount two pairs of bearings 5 and 6 to support yokes 7, in the ends of which wheels or rollers 8 are mounted. These yokes include a cross-bar 9 to be engaged by hooks 10 formed at the lower ends of links 11, which are pivotally mounted in brackets 12 secured to the underside of the sled, forward of the bearings 5 and 6, and adapted, when the yokes are turned to a vertical position, to engage with the cross-bar 9, so as to lock the rollers against forward and upward movement, but which allow the rollers to be moved forwardly and upwardly to the retired position when the hooks are disengaged from the yokes, these links being provided with bends 21, to form shoulders to resist the upward movement of the yokes.

At the forward end, I provide bearings 13 and 14 for yokes 15, to the lower ends of which rollers 16 are swivelly connected. These yokes 15 also have cross-bars 17, to be engaged by hooks 18 formed at the lower end of links 19, which are pivotally mounted in bearings 20, these bearings being arranged in rear of the bearings 13 and 14, so that, when the rollers are turned down into a vertical position, the hooks will engage with the bars and lock the yokes in a vertical position, the hooks being also formed with reverse bends 22, which prevent the rearward and upward movement of the yokes, but permit the yokes to be raised when the hooks are disengaged.

The parts are so constructed that they will be held in position by friction. The bends in the hooks firmly engage the yokes, but if desired, spring-pins 24 may be secured to the yokes, to engage with the hooks, as shown in Fig. 3.

With this construction, the rollers are readily turned down, so that they project below the runners of the sled and so support the sled above the ground, so that the sled may be readily drawn over bare places.

The devices may be manufactured as units and readily applied to sleds of ordinary construction.

I claim:

The combination with a sled, of a pair of yokes mounted near the rear, rollers mounted in the lower ends of said sled and adapted to project below the runners thereof when in a vertical position, links pivotally connected with the sled and formed with hooks adapted to engage with said yokes, whereby they are locked in a vertical position, a pair of yokes pivotally connected to the underside of the sled, near the forward end thereof, rollers pivotally connected with said yoke and adapted to extend below the runners of the sled when in a vertical position, links pivotally connected with the underside of the sled, in line with said yokes, and formed with hooks adapted to engage with said yokes, whereby they may be held in a vertical position.

In testimony whereof, I have signed this specification.

ROBERT BURRELL.